US009494272B2

(12) United States Patent
Thayer et al.

(10) Patent No.: US 9,494,272 B2
(45) Date of Patent: Nov. 15, 2016

(54) INSULATION JACKET AND INSULATION JACKET SYSTEM

(75) Inventors: Scott M. Thayer, Pittsburgh, PA (US); Brian Bannon, Milford, CT (US)

(73) Assignee: EMBEDDED ENERGY TECHNOLOGY, LLC, Pittsburgh, PA (US)

( * ) Notice: Subject to any disclaimer, the term of this patent is extended or adjusted under 35 U.S.C. 154(b) by 842 days.

(21) Appl. No.: 12/907,371

(22) Filed: Oct. 19, 2010

(65) Prior Publication Data

US 2011/0264399 A1    Oct. 27, 2011

Related U.S. Application Data

(60) Provisional application No. 61/252,911, filed on Oct. 19, 2009.

(51) Int. Cl.
| | | |
|---|---|---|
| G01K 17/00 | (2006.01) | |
| F16L 59/00 | (2006.01) | |
| F16L 59/16 | (2006.01) | |
| G01K 17/20 | (2006.01) | |
| F24F 11/00 | (2006.01) | |

(52) U.S. Cl.
CPC ............ F16L 59/168 (2013.01); G01K 17/20 (2013.01); *F24F 2011/0094* (2013.01)

(58) Field of Classification Search
CPC ............ F24F 2011/0094; G01K 17/20; F16L 59/168
USPC ........................................................ 702/136
See application file for complete search history.

(56) References Cited

U.S. PATENT DOCUMENTS

| | | | |
|---|---|---|---|
| 3,818,949 A | | 6/1974 | Johnson |
| 4,207,918 A | * | 6/1980 | Burns et al. .................. 137/375 |
| 4,246,785 A | * | 1/1981 | Sellers et al. ................... 374/43 |
| 4,259,981 A | | 4/1981 | Busse |
| 4,449,554 A | | 5/1984 | Busse |
| D293,703 S | | 1/1988 | Kaye |
| 5,717,609 A | * | 2/1998 | Packa et al. .................. 702/130 |
| 5,973,602 A | * | 10/1999 | Cole, III .............. A62B 17/003 2/93 |
| 6,000,420 A | * | 12/1999 | Nicholson et al. ......... 137/15.01 |
| 6,628,208 B1 | * | 9/2003 | Morozumi et al. ...... 340/870.28 |

(Continued)

FOREIGN PATENT DOCUMENTS

WO    WO 2008047068 A1 *   4/2008

OTHER PUBLICATIONS

John Krigger, Residential Energy: Cost Savings and Comfort for Existing Buildings, Jan. 1, 2004, pp. 67-68.*

(Continued)

*Primary Examiner* — Gregory J Toatley
*Assistant Examiner* — Michael Dalbo
(74) *Attorney, Agent, or Firm* — K&L Gates LLP (57) ABSTRACT

A thermal insulation jacket system comprising: a first thermal insulation jacket configured to fit on an object; a microcontroller located in the first thermal insulation jacket; a first temperature measuring means in signal communication with the microcontroller, configured to measure the temperature of the object; a second temperature measuring means in signal communication with the microcontroller, configured to measure the ambient temperature; where the microcontroller is configured to determine the energy savings achieved by the insulative properties of the first thermal insulation jacket.

25 Claims, 4 Drawing Sheets

(56) References Cited

U.S. PATENT DOCUMENTS

| | | | |
|---|---|---|---|
| 2005/0115600 A1* | 6/2005 | DeSteese et al. | 136/205 |
| 2005/0248249 A1* | 11/2005 | Kirby et al. | 312/401 |
| 2006/0037334 A1* | 2/2006 | Tien et al. | 62/178 |
| 2007/0256432 A1* | 11/2007 | Zugibe | F25B 49/02 62/115 |
| 2008/0150737 A1* | 6/2008 | Karschnia | 340/605 |
| 2008/0195355 A1* | 8/2008 | Brandt et al. | 702/188 |
| 2009/0056649 A1* | 3/2009 | MacKenzie | 122/504 |
| 2009/0188017 A1* | 7/2009 | Kruse | 2/81 |
| 2010/0156666 A1* | 6/2010 | Choi et al. | 340/870.07 |

OTHER PUBLICATIONS

David Storm, Winery Utilities: Planning, Design and Operation, Nov. 30, 2000, pp. 103-104.*

John Krigger, Residential Energy: Cost Savings and Comfort for Existing Buildings, Jan. 1, 2004, pp. 15 and 69.*

* cited by examiner

INSULATION JACKET AND INSULATION JACKET SYSTEM

CROSS-REFERENCES

The present application claims the benefit of provisional patent application No. 61/252,911 filed on Oct. 19, 2009 by Scott Thayer and Brian Bannon, the entire contents of which are fully incorporated by reference herein.

TECHNICAL FIELD

This invention relates generally to an insulation jacket used on valves and pipes, and more particularly to a "smart" insulation jacket system used on pipes and valves that can measure, monitor, communicate, and archive the energy savings realized by using the insulation jacket.

BACKGROUND

Currently, end users are able to employ a host of on-line energy savings calculators to estimate the average savings in fuel costs on a per pipe or valve basis. These calculators compute average energy savings by taking the following as input parameters:
1) Pipe or Valve Temperature
2) Ambient Air Temperature
3) Pipe or Valve Size information
4) Type and Thickness of Insulation Inputs regarding valve geometry and jacket insulation can usually be obtained from standard vendor specifications. However, pipe and ambient air temperature measurements must be obtained manually (by hand) from the pipe. Usually, this process is done very infrequently since it is difficult to perform and good enough estimates can be derived from historical numbers to prove the economic benefit of purchasing a particular insulation product. Since there are no industry standard tools to measure the performance of an installed insulation product over time, specific performance analysis of insulation products is not done outside of the laboratory due to the difficulty in obtaining the required input parameters.

It is well known in the industrial piping market that insulating high temperature pipes and valves from the ambient temperature can save a significant amount of energy. Historically, insulators put in place permanent insulation that required removal and replacement during maintenance operations. More recently, removable valve jackets and pipe insulations were innovated to remove the need to replace insulating materials during maintenance. Reusable insulation represents a significant advance for the owner/operators; however, there is no direct means of measuring the energy savings from a program of insulation, be it removable or permanent.

Thus there is a need for a system and device that can obtain the above desired energy savings data and on a regular basis, archive the data, and communicate the data to a device such as a computer, or hand held monitoring apparatus.

SUMMARY OF THE INVENTION

The disclosed invention relates to a thermal insulation jacket system comprising: a first thermal insulation jacket configured to fit on an object; a microcontroller located in the first thermal insulation jacket; a first temperature measuring means in signal communication with the microcontroller, configured to measure the temperature of the object; a second temperature measuring means in signal communication with the microcontroller, configured to measure the ambient temperature; where the microcontroller is configured to determine the energy savings achieved by the insulative properties of the first thermal insulation jacket.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

The disclosed invention integrates advanced electronics, sensing, and software directly into traditional removable insulation products.

A wide variety of thermal insulation jackets may be used with the disclosed invention. The thermal insulation jacket itself may be made of a wide variety of materials and in a wide variety of thicknesses and dimensions. In one embodiment, the thermal insulation jacket itself comprises a fiberglass cloth fabric coated with a silicone rubber coating so as to render the fabric resistant to water and ambient conditions. One fabric may be 100% fiberglass lagging cloth. By selecting the proper outer facing for the insulation jacket the jacket may be easily removed and readily re-used thus reducing cost while providing effective insulation efficiency.

The insulation jacket may be stuffed with a lightweight flexible mat which preferably comprises type-E glass fibers although other types of packing may obviously be used depending upon the particular specifications. The thickness of the jacket may commonly be between 1 and 2 inches although other thicknesses are within the scope of the invention depending upon specific conditions.

The jacket may be provided with a pair of inboard and outboard straps on each of the lateral sections of the jacket which make it possible to tightly secure the jacket around a valve casing such that the jacket extends beyond the flange formed between the casing and the line and may thus be tightened around the pipe insulation provided on the line to completely and thermally insulate the valve casing from the atmosphere.

The straps may be held in place by means of lateral fasteners which hold the straps in place while permitting longitudinal sliding movement. When properly fitted, the jacket may extend beyond the flange and the inboard and outboard straps are properly adjusted so as to provide an effective seal in conjunction with insulation provided along the connecting line.

Figure 1:
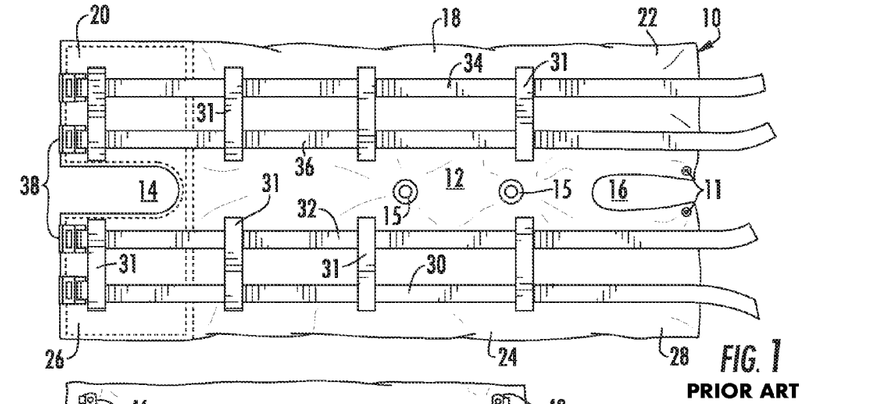
FIG. 1 is a top view of the thermal insulation jacket.

FIG. 1 illustrates one embodiment of a thermal insulation jacket 10 which comprises lateral sections 18 and 24 with end flap sections 20, 22 and 26, 28 separated by means of slightly differing U-shaped cutouts 14 and 16 respectively. Each of the lateral sections 18 and 24 is separated by means of a central section 12. The central section comprises weep holes 15 which permit fluid which has leaked from the line to visibly drain out of the jacket. Outboard straps or belts 30 and 34 as well as inboard straps or belts 32 and 36 are respectively located on each of lateral sections 24 and 18. Each of the straps is provided with a buckle at one end thereof adapted to receive the other end of the strap such that the strap may be tightened around the valve casing when the jacket is wound around the casing. Although the straps are each illustrated as having a buckle 38 and a free end, the straps may be provided with a wide variety of fastening means to be used in conjunction with each of the straps.

Each of the straps is generally maintained in place by means of lateral securing strips 31 which, although holding the straps onto the jacket, nevertheless permit the straps to slide longitudinally.

As shown, the flaps 20 and 26 comprise unpadded insulation while flaps 22 and 28 are padded in a fashion similar to the central portion of the jacket. Flaps 20 and 26 are adapted to overlap flaps 22 and 28 when the jacket is used. To facilitate assembly of the jacket grommets 11 may be provided which permit the user to secure flaps 22 and 28 around the upstanding portion of the valve by means of wires or the like which secure one end of the jacket to the valve casing thus freeing both of the user's hands to wrap and strap the jacket.

Figures 2, 3, 4, 5:
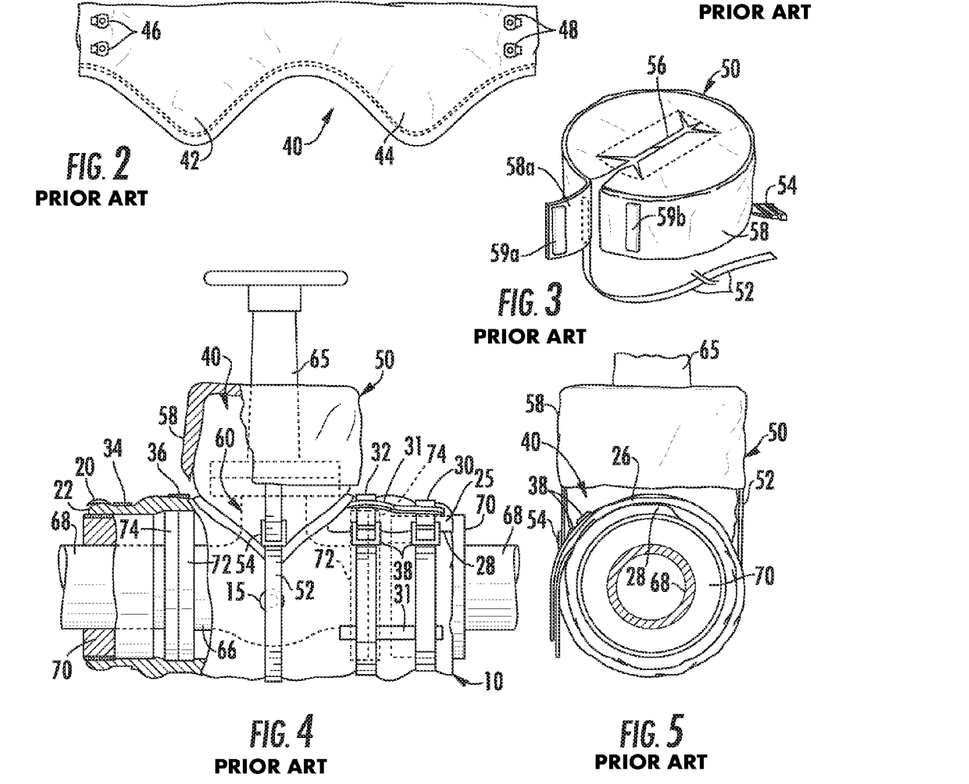
FIG. 2 is a side view of the skirt of the thermal insulation jacket in flattened condition.
FIG. 3 is an perspective view of the cap of the thermal insulation jacket.
FIG. 4 is a side view of the insulation jacket, partially cut away, when used in conjunction with a valve casing.
FIG. 5 is an end view of the insulation jacket in the assembled position.

FIG. 2 illustrates an insulation skirt which may be used in conjunction with the jacket of the invention so as to thermally insulate the upstanding portion of a valve casing against thermal losses. As shown, the skirt 40 is provided with parabolic shaped sections which, when the skirt is wrapped around an upstanding section of a valve casing, correspond to the U-shaped cutouts of the insulation jacket. The skirt 40 is additionally provided with fastening means 46 and 48 which make it possible to securely fasten the skirt. The fastening means may comprise a series of hooks adapted to be used in conjunction with twist wires or the like for securing the skirts. Additionally, the skirt may be provided with a series of straps such as those disclosed in FIG. 1 or may be fastened in any other desired fashion.

FIG. 3 illustrates an insulation cap 50 provided with an upper wall and a slit 56 adapted to accommodate the control wheel of a valve mounted on a valve stem such that the cap may be slipped over the control wheel and lowered to surround the skirt by means of a lateral wall 58. The lateral wall is provided with a strap 52 and buckle 54 for securing the cap over the skirt and around the valve casing.

The cap may further be provided with mating Velcro sections 59a and 59b in cutaway section 58 to provide for further ease of assembly.

FIG. 4 illustrates the insulation jacket when used in conjunction with a valve casing 60 having an upstanding section 65 and a horizontal section 66. The horizontal section of the valve casing ends in a flange 72 which mates with a flange 74 provided at the edge of line pipe 68. Line pipe 68 is encased within conventional insulation 70 which forms a cylindrical casing around the pipe line. As shown, the insulation 70 extends up to flange 74. Insulation jacket 10 provided with inboard strap 30 and outboard strap 32 is wound around horizontal valve casing section 66 and is adapted to extend beyond flanges 72 and 74 such that it extends up to and over insulation jacket 70. Inboard strap 30 surrounds the mating point of the two flanges 72 and 74 to tightly seal the jacket around the horizontal section of the casing while outboard strap 32 located beyond flange 74 securely and effectively maintains the insulation jacket wrapped around insulation jacket 70 thus assuring an essentially complete seal.

As may be seen from FIG. 5, the insulation jacket may be used by winding it around the valve casing such that flaps 26 and 20 overlap flaps 22 and 28 and are strapped over line insulation 70 by means of outboard straps 30 and 36. The above disclosed thermal insulation jacket is but one embodiment of a thermal insulation jacket, other thermal insulation jacket designs may be used with this invention.

The disclosed invention may be referred to as "Smart Jacket" concept that builds upon the concepts disclosed in U.S. Pat. No. 4,207,918 and extends those concepts to produce a jacket capable of direct monitoring of the energy savings realized by the end user of the smart jacket. The smart jacket concept focuses on embedding a computer, power supply, pipe temperature sensors, ambient temperature sensors, jacket surface temperature sensors, human interface devices, solid state storage, and display into the jackets concepts indicated by FIG. 6 above. Thus, the smart jacket, using energy savings calculations, would be enabled to directly monitor, log, and communicate the realized energy savings directly or indirectly to the end user.

Figure 6:
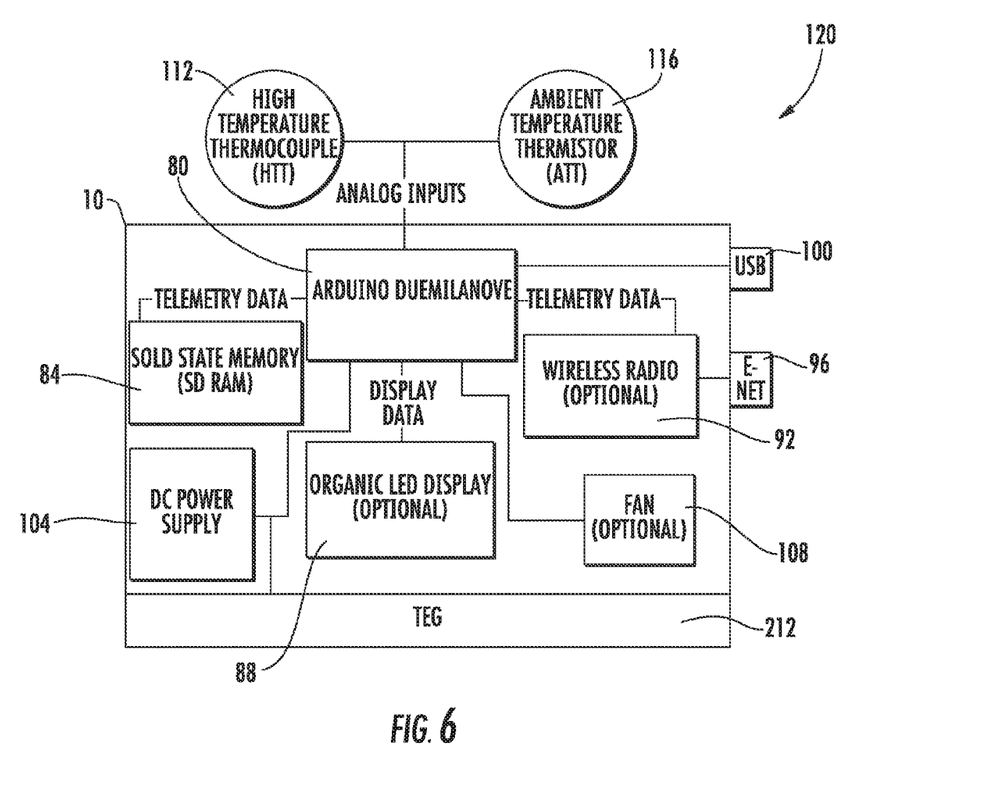
FIG. 6 is a schematic diagram of the insulation jacket system.

FIG. 6 shows a schematic of the disclosed system. The box 10 represents the thermal insulation jacket. The entire system 120 is the "smart jacket". Located within the insulation jacket 10 is a microcontroller 80, which may be, but is not limited to, an Arduino Duemilanove microcontroller board. In signal communication with the microcontroller 80 is a memory device 84, which may be, but is not limited to an SD RAM. Also in signal communication with the microcontroller 80 may be an optional display device 88 such as, but not limited to an organic LED display. Also in signal communication with the microcontroller 80 is an optional communication device 92, such as, but not limited to a wireless radio, that can both transmit and receive wireless signals. In signal communication with the microcontroller 80 is network communication connection 96, which may be an Ethernet connection. In addition, the smart jacket may have a USB port 100 that is in signal communication with the microcontroller 80. An optional power supply 104 may be located within the smart jacket. An optional fan 108 may also be part of the smart jacket. There will be at least one temperature measuring means 112. The temperature measuring means may include, but are not limited to thermocouples, thermistors, and RTDs. The temperature measuring means 112 measures the temperature of the industrial or heating equipment that achieves a high temperature. The disclosed insulation jacket and insulation jacket system may be used on any industrial or heating equipment that achieves a high temperature, including but not limited to: pipes, valves, furnaces, tanks, vessels, boilers, pumps, turbomachinery, reciprocating machinery, and ball joints. The temperature measuring means 112 is in signal communication with the microcontroller 80. In addition, there is a temperature measuring means 116 that measures the ambient air temperature, and is also in signal communication with the microcontroller 80. The temperature measuring means 112 may be a high temperature thermocouple. It may be placed under the thermal insulation jacket 10 in order to measure the pipe temperature. The thermocouple 116 may be an ambient temperature thermocouple exposed to the environment to measure the ambient temperature. The microcontroller 80 may be configured to convert the signals from the temperature measuring means 112 and 116 into calibrated temperatures, and may configured to calculate the energy savings due to the prevention of excessive heat transfer due to the insulation properties of the insulated jacket. The memory 84 maybe be solid state memory such as SD RAM, and may be configured to store telemetry in a log that can be used for audit and invoicing purposes. The smart jacket 120 may also comprise a display (not shown) in communication with the microcontroller 80. The display may display the real-time energy savings provided by the invention. The radio 92 may be configured to web-enable the smart jacket system 120. The fan 108 (optional) may be configured to cool the smart jacket system 120, especially when operating in high temperature environments. The optional power supply 104 may be configured to allow the smart jacket system 120 to run on 120 V AC, 12 VDC, or internal LION power supply. In another embodiment, the smart jacket system 120 may include a bank of thermoelectric generators (TEGs) 212 that are capable of converting the heat energy radiated by the pipe directly into electrical energy. This is possible due to the "Seebeck" or thermoelectric effect. This effect makes it possible to directly convert heat energy into electrical electricity.

In one embodiment, their may be a plurality of smart jackets in communication with one another to monitor the energy savings of an entire area and may communicate and may reason regarding efficiency.

The smart jacket may monitor its own energy savings and alert the owner to situations when the savings falls below a threshold. Examples of problems that would reduce efficiency are: the smart jacket has become physically damaged; the jacket has become dislodged: the jacket insulation efficiency has deteriorated, etc. In another embodiment of the invention, there may be an additional thermistor, RTD, or thermocouple on the surface of the jacket to measure the differential between the pipe temperature and the temperature of the jacket surface. This is a different measurement than the ambient air temperature referred to in FIG. 6.

Power Generation

In another embodiment of the invention, the smart jacket would have a power harvesting device that can convert heat energy from the valves and/or pipes into electrical energy to power smart jacket.

The smart jacket system 120, in an other embodiment, may include a bank of thermoelectric generators (TEGs) 212 (see FIG. 6) that are capable of converting the heat energy radiated by the pipe directly into electrical energy. This is possible due to the "Seebeck" or thermoelectric effect. This effect makes it possible to directly convert heat energy into electrical electricity.

Generated electrical energy can be used to directly power the smart jacket electronics or charge the onboard battery. Thermoelectric generators have typical efficiencies of around 5-10% (each device producing on the order of microvolts per degree Kelvin). As an example, copper-constantan produces 41 micro volts per degree Kelvin, requiring the use of several devices to produce a sufficient output voltage for direct or indirect power.

The smart jacket concept can be extended to include the idea of harvesting energy in the form of heat from the pipe and converting it to electrical energy to power smart jacket electronics, communications. This power harvesting capability will free the smart jacket from the need to have internal batteries or external power.

In addition, for smart jackets that are used outdoors they may be used in conjunction with solar cells, to provide direct power to the smart jacket electronics as well as indirect power through charging of the batteries.

Power management electronics make it possible to construct a smart jacket that includes any combination of power generation and energy storage devices, for example batteries, fuel cells, solar cells, thermoelectric generators, micro-steam turbines, etc. to provide a constant stream of power to the smart jacket components.

Smart Jacket Network

Figure 7:
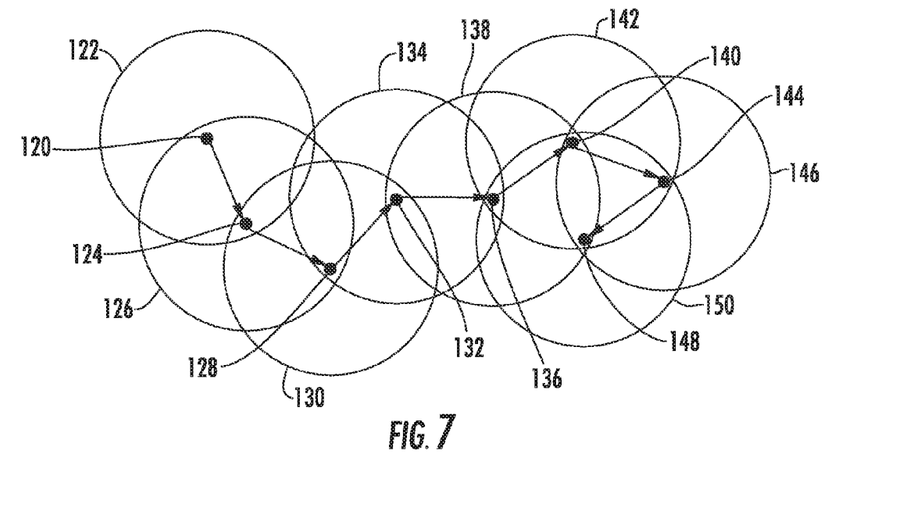
FIG. 7 is a conceptual illustration of the ad-hoc network.

An integral part of the smart jacket assembly is the radio 92 that enables bi-directional flow of control signals and telemetry. As such, a facility instrumented with radio equipped smart jackets 120 can form explicit or ad-hoc networks (see FIG. 2) that can forward and relay information between smart jacket devices. Furthermore, smart jackets 120 can interface with external networks to provide remote displays of status and enable remote control. FIG. 7 is conceptual illustration of the radio equipped smart jacket system forming an ad-hoc network. A first smart jacket system 120 is shown, with a first zone of radio signal communication 122. The first zone of radio signal communication, as well as every other zone of radio signal communication, is that zone where the radio 92 in the respective smart jacket system is able to transmit and receive radio signals. A second smart jacket system 124 is shown, with a second zone of radio signal communication 126. A third smart jacket system 128 is shown, with a third zone of radio signal communication 130. A fourth smart jacket system 132 is shown, with a fourth zone of radio signal communication 134. A fifth smart jacket system 136 is shown, with a fifth zone of radio signal communication 138. A sixth smart jacket system 140 is shown, with a sixth zone of radio signal communication 142. A seventh smart jacket system 144 is shown, with a seventh zone of radio signal communication 146. An eighth smart jacket system 148 is shown, with an eighth zone of radio signal communication 150. Whenever two or more smart jacket systems are within a single zone of radio signal communication, those two or more smart jacket systems can communicate with each other via their respect radios 92.

A smart jacket network, thus formed, provides significant value to the facility owner/operator. The network serves as a monitoring and diagnostic device for the entire pipe network in the same way that a single jacket monitors the valve (or similar device) that it encloses. Furthermore, smart jackets can contain additional features unrelated to piping that enhance facility safety, security, and operations.

For example, a smart jacket equipped with motion detectors can publish activity through the network to the remote control station. This provides a significant ability to enhance facility security and simultaneously monitor pipeline performance.

Smart Jacket Sensors

The smart jackets sensors may include humidity, pressure, vibration, inertial, anti-tamper, visual and thermal cameras, point and line lasers to provide advanced diagnostics and auxiliary monitoring functionality.

For example, a networked smart jacket with visual or thermal cameras could monitor pipe performance and serve a facility security function as well.

Another example, a line laser could provide a safety function by have the microphone-equipped smart jacket issue a warning to approaching personal to watch out for "hot pipes" and low hanging structures that present risk for head injury. There are a million other examples.

The smart jacket can also support control and actuation in either individual or networked modes. Example uses of smart jacket actuation include facility access control, lighting control, temperature control, etc.

Smart jackets can be configured to with a variety of sensors and actuators to perform an essentially limitless number of facility monitoring and control functions. Furthermore, the control and monitoring of these functions can be transported to a remote monitoring facility by the smart jacket network.

For example, if a component fails the smart jacket could communicate the failed status of the device into the smart jacket network and affect an upstream bypass that would keep the steam supply moving through a parallel path and effectively take the failed component off line.

Advanced Smart Jacket Pipeline Diagnostics

Figure 8:
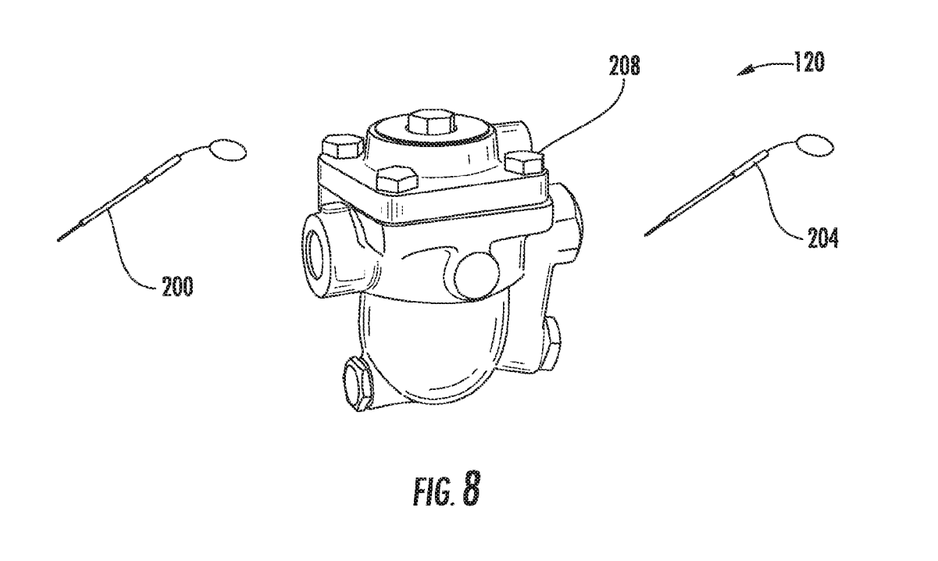
FIG. 8 is a semi-exploded view of the advanced diagnostics embodiment of the invention.

Smart Jackets in individual or networked configurations can perform advanced pipeline diagnostics. For example, an individual smart jacket can be configured to monitor the inflow and outflow temperature of a valve (or other device) using, for example, a two-temperature measuring means arrangement, see FIG. 8. This configuration enables advanced diagnostics on performance and provides redundancy to the energy savings calculation. FIG. 8 shows a semi-exploded view of a smart jacket system 120 comprising a device, in this example a steam trap 208, to be enclosed by the thermal insulation jacket 10 (not shown). The smart jacket system 120 will comprise a first temperature measuring means 200 to detect the inflow temperature of the stream, and a second temperature measuring means 204 detects the outflow temperature of the stream. The temperature measuring means will be in communication with the microcontroller 80 (not shown).

This arrangement in the preceding paragraph can be extended to multiples of sensors of the types described previously. This increasingly potent combinations device-level and network level functions are made possible using the smart-jacket-network. As previously described network level functions can include pipeline diagnostics, facility monitoring, security, and safety (as examples). The smart jacket system 120 may be configured such that the microcontroller 80 is in signal communication with a remote monitoring facility, such as a site control room.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A thermal insulation jacket system comprising:
   a first thermal insulation jacket removably connected to an object, wherein the first thermal insulation jacket surrounds the object and comprises an exterior surface and an interior surface opposite the exterior surface;
   a microcontroller embedded within the first thermal insulation jacket between the exterior surface and the interior surface;
   a first temperature measuring means in signal communication with the microcontroller, and configured to measure the temperature of the object, wherein the first temperature sensing means is embedded within the first thermal insulation jacket between the exterior surface and the interior surface;
   a second temperature measuring means in signal communication with the microcontroller, and configured to measure the ambient temperature proximate the first thermal insulation jacket, wherein the second temperature sensing means is embedded within the first thermal insulation jacket between the exterior surface and the interior surface;
   a third temperature measuring means proximate an inlet to the object in signal communication with the microcontroller; and
   a fourth temperature measuring means proximate an outlet to the object in signal communication with the microcontroller,
   wherein the microcontroller is configured to:
   determine real-time measured energy savings achieved by the first thermal insulation jacket based on temperatures measured by the first and second temperature measuring means; and
   confirm the determined real-time measured energy savings based on temperatures measured by the third and fourth temperature measuring means.

2. The thermal insulation jacket system of claim 1, wherein the object is a piece of industrial or heating equipment that achieves a high temperature.

3. The thermal insulation jacket system of claim 1, wherein the object is selected from the group consisting of a steam trap, pipe, valve, furnace, tank, vessel, boiler, pump, turbomachinery, reciprocating machinery, and ball joint.

4. The thermal insulation jacket system of claim 1, further comprising:
   a memory located in the first thermal insulation jacket, and in signal communication with the microcontroller; and
   a communication device located in the first thermal insulation jacket, and in signal communication with the microcontroller.

5. The thermal insulation jacket system of claim 4, wherein the communication device is a wireless radio.

6. The thermal insulation jacket system of claim 5, further comprising:
   a second thermal insulating jacket removably connected to a second object, wherein the second thermal insulating jacket surrounds the second object;
   a second microcontroller located in the second thermal insulation jacket;
   a fifth temperature measuring means covered by the second thermal insulation jacket, in signal communication with the second microcontroller, and configured to measure the temperature of the second object;
   a sixth temperature measuring means proximate the second thermal insulation jacket, in signal communication with the microcontroller, and configured to measure the ambient temperature proximate the second thermal insulative jacket;
   a second wireless radio located in the second thermal insulation jacket, and in signal communication with the second microcontroller;

wherein the second microcontroller is configured to determine real-time measured energy savings achieved by the second thermal insulation jacket;

and wherein the wireless radio from the first thermal insulation jacket and the second wireless radio from the second thermal insulation system form a first network, then can forward and relay information between the wireless radio in the first thermal insulation jacket and the second wireless radio in the second thermal insulation jacket, and wherein the first network can be configured to communicate with an external network.

7. The thermal insulation jacket system of claim 1, further comprising:
a power supply located in the first thermal insulation jacket, and in signal communication with the microcontroller; and
a fan located in the first thermal insulation jacket, in signal communication with the microcontroller, and configured to cool at least one of the electronic components located in the first thermal insulation jacket.

8. The thermal insulation jacket system of claim 1, further comprising:
at least one thermoelectric generator located in the first thermal insulation jacket, and configured to harvest heat from the object and convert the heat to usable electricity, the at least one thermoelectric generator is in communication with the microcontroller.

9. The thermal insulation jacket system of claim 1, further comprising:
a sensor in signal communication with the microcontroller, the sensor selected from the group consisting of a temperature sensing means, a humidity sensor, a pressure sensor, a vibration sensor, an inertial sensor, an anti-tamper sensor, a visible light camera, a thermal camera, a microphone and a point and line laser.

10. The thermal insulation jacket system of claim 9, wherein the microcontroller is configured to perform a diagnostic analysis using sensor data.

11. The thermal insulation jacket system of claim 1, wherein the microcontroller is in signal communication with a remote monitoring facility.

12. The thermal insulation jacket system of claim 11:
wherein the microcontroller is configured to convert the real-time measured energy savings into a monetary amount representing fuel costs savings in dollars, and the microcontroller is programmed with a threshold alarm, such that when the real-time measured energy savings falls below a programmed threshold level, the threshold alarm is activated; and
wherein the microcontroller is further configured to communicate the monetary amount representing fuel costs savings in dollars and alarms to the remote monitoring facility.

13. The thermal insulation jacket system of claim 1, wherein the microcontroller is configured to perform a diagnostic analysis using temperature measuring means data.

14. The thermal insulation jacket system of claim 1, wherein the microcontroller converts the real-time measured energy savings into a monetary amount representing fuel costs savings in dollars.

15. The thermal insulation jacket system of claim 1, wherein the microcontroller is programmed with a threshold alarm, such that when the real-time measured energy savings falls below a programmed threshold level, the threshold alarm is activated.

16. The thermal insulation jacket system of claim 1, wherein:
the third temperature measuring means comprises an inflow temperature measuring means covered by the first thermal insulation jacket; and
the fourth temperature measuring means comprises an outflow temperature measuring means covered by the first thermal insulation jacket.

17. A system, comprising:
an insulation jacket, wherein the insulation jacket is removably connected to an object, comprises a first surface and a second surface opposite the first surface, and surrounds the object;
a first temperature measuring device embedded within the insulation jacket and proximate the first surface of the insulation jacket, wherein the first temperature measuring device is proximate an external surface of the object;
a second temperature measuring device embedded within the insulation jacket and proximate the second surface of the insulation jacket;
a third temperature measuring device proximate an inlet to the object;
a fourth temperature measuring device proximate an outlet of the object; and
a computing system embedded within the insulation jacket between the first and second surfaces, wherein the computing system is communicably connected to the first, second, third and fourth temperature measuring devices and is configured to:
determine real-time measured energy savings attributable to the insulation jacket based on temperatures measured by the first and second temperature measuring devices; and
confirm the determined real-time measured energy savings based on temperatures measured by the third and fourth temperature measuring devices.

18. The system of claim 17, wherein the computing system is further configured to wirelessly transmit the determined real-time measured energy savings.

19. The method of claim 18, further comprising wirelessly transmitting the determined real-time measured energy savings.

20. A method, comprising:
determining a temperature of an external surface of an object proximate a first surface of an insulation jacket removably connected to and surrounding the object;
determining a temperature of a second surface of the insulation jacket;
determining an ambient temperature proximate the second surface of the insulation jacket;
determining a temperature at an inlet to the object;
determining a temperature at an outlet of the object; and
at a computing device embedded within the insulation jacket between the first and second surfaces:
determining real-time measured energy savings attributable to the insulation jacket based on the determined temperatures of the external surface of the object and the ambient temperature; and
confirming the determined real-time energy savings based on the determined temperatures at the inlet and outlet of the object.

21. A system, comprising:
a first temperature measuring device positioned to measure a temperature proximate an inlet of a steam trap;

a second temperature measuring device positioned to measure a temperature proximate an outlet of the steam trap;
a thermal insulation jacket removably connected to the steam trap and comprising a first surface proximate the steam trap and a second surface opposite the first surface, wherein the thermal insulation jacket surrounds the first temperature measuring device, the second temperature measuring device and the steam trap, and wherein the first and second temperature measuring devices are embedded within the thermal insulation jacket between the first and second surfaces;
a third temperature measuring device positioned to measure a temperature proximate an exterior surface of the steam trap;
a fourth temperature measuring device positioned to measure an ambient temperature proximate the second surface of the thermal insulation jacket; and
a microcontroller electrically connected to the first, second, third and fourth temperature measuring devices, wherein the microcontroller is embedded within the thermal insulation jacket between the first and second surfaces and positioned proximate one of the first and second surfaces of the thermal insulation jacket, and wherein the microcontroller is configured to:
determine an energy savings realized by the thermal insulation jacket in real-time based on temperatures measured by the third and fourth temperature measuring devices; and
confirm the determined energy savings realized by the thermal insulation jacket in real-time based on temperatures measured by the first and second temperature measuring devices.

22. A system, comprising:
a wireless node, comprising:
a wireless communication device; and
a microcontroller connected to the wireless communication device;
a plurality of sensors electrically connected to the microcontroller, wherein the plurality of sensors comprises:
a first temperature sensor positioned to sense a temperature of a steam trap;
a second temperature sensor positioned to sense an ambient temperature;
a third temperature sensor positioned to sense a temperature proximate an inlet of the steam trap; and
a fourth temperature sensor positioned to sense a temperature proximate an outlet of the steam trap; and
a thermal insulation jacket removably connected to the steam trap, wherein the thermal insulation jacket surrounds the first, second, third and fourth temperature sensors and the steam trap and comprises a first surface and a second surface opposite the first surface, wherein at least one of the temperature sensors is embedded within the thermal insulation jacket between the first and second surfaces, and wherein the microcontroller is embedded within the thermal insulation jacket between the first and second surfaces and is configured to:
determine an energy savings realized by the thermal insulation jacket in real-time based on temperatures sensed by the first and second temperature sensors; and
confirm the determined energy savings based on temperatures sensed by the third and fourth temperature sensors.

23. The system of claim 22, wherein the wireless communication device comprises a wireless radio.

24. The system of claim 22, wherein the wireless node further comprises a power supply electrically connected to the microcontroller.

25. A system, comprising:
a first wireless node, comprising:
a first wireless communication device; and
a first microcontroller connected to the first wireless communication device;
a first plurality of sensors electrically connected to the first microcontroller, wherein the first plurality of sensors comprises:
a first temperature sensor positioned to sense a temperature of a first steam trap;
a second temperature sensor positioned to sense an ambient temperature proximate the first steam trap;
a third temperature sensor positioned to sense a temperature proximate an inlet of the first steam trap; and
a fourth temperature sensor positioned to sense a temperature proximate an outlet of the first steam trap; and
a first thermal insulation jacket removably connected to the first steam trap, wherein the first thermal insulation jacket surrounds the first steam trap and comprises a first surface and a second surface opposite the first surface, wherein at least one of the first plurality of sensors is embedded within the first thermal insulation jacket between the first and second surfaces, and wherein the first microcontroller is embedded within the first thermal insulation jacket between the first and second surfaces and is configured to:
determine an energy savings realized by the first thermal insulation jacket in real-time based on temperatures sensed by the first and second temperature sensors; and
confirm the determined energy savings based on temperatures sensed by the third and fourth temperature sensors;
a second wireless node communicably connected to the first wireless node, wherein the second wireless node comprises:
a second wireless communication device; and
a second microcontroller connected to the second wireless communication device;
a second plurality of sensors electrically connected to the second microcontroller, wherein the second plurality of sensors comprises:
a fifth temperature sensor positioned to sense a temperature of a second steam trap;
a sixth temperature sensor positioned to sense an ambient temperature proximate the second steam trap;
a seventh temperature sensor positioned to sense a temperature proximate an inlet of the second steam trap; and
an eighth temperature sensor positioned to sense a temperature proximate an outlet of the second steam trap; and
a second thermal insulation jacket removably connected to the second steam trap, wherein the second thermal insulation jacket surrounds the second steam trap and comprises a first surface and a second surface opposite the first surface, wherein at least one of the second plurality of sensors is embedded within the second thermal insulation jacket between the first and second surfaces, and wherein the second microcontroller is embedded within the second thermal insulation jacket between the first and second surfaces and is configured to:
determine an energy savings realized by the second thermal insulation jacket in real-time based on temperatures sensed by the fifth and sixth temperature sensors; and
confirm the determined energy savings realized by the second thermal insulation jacket based on temperatures sensed by the seventh and eighth temperature sensors.

* * * * *